Figure 1:
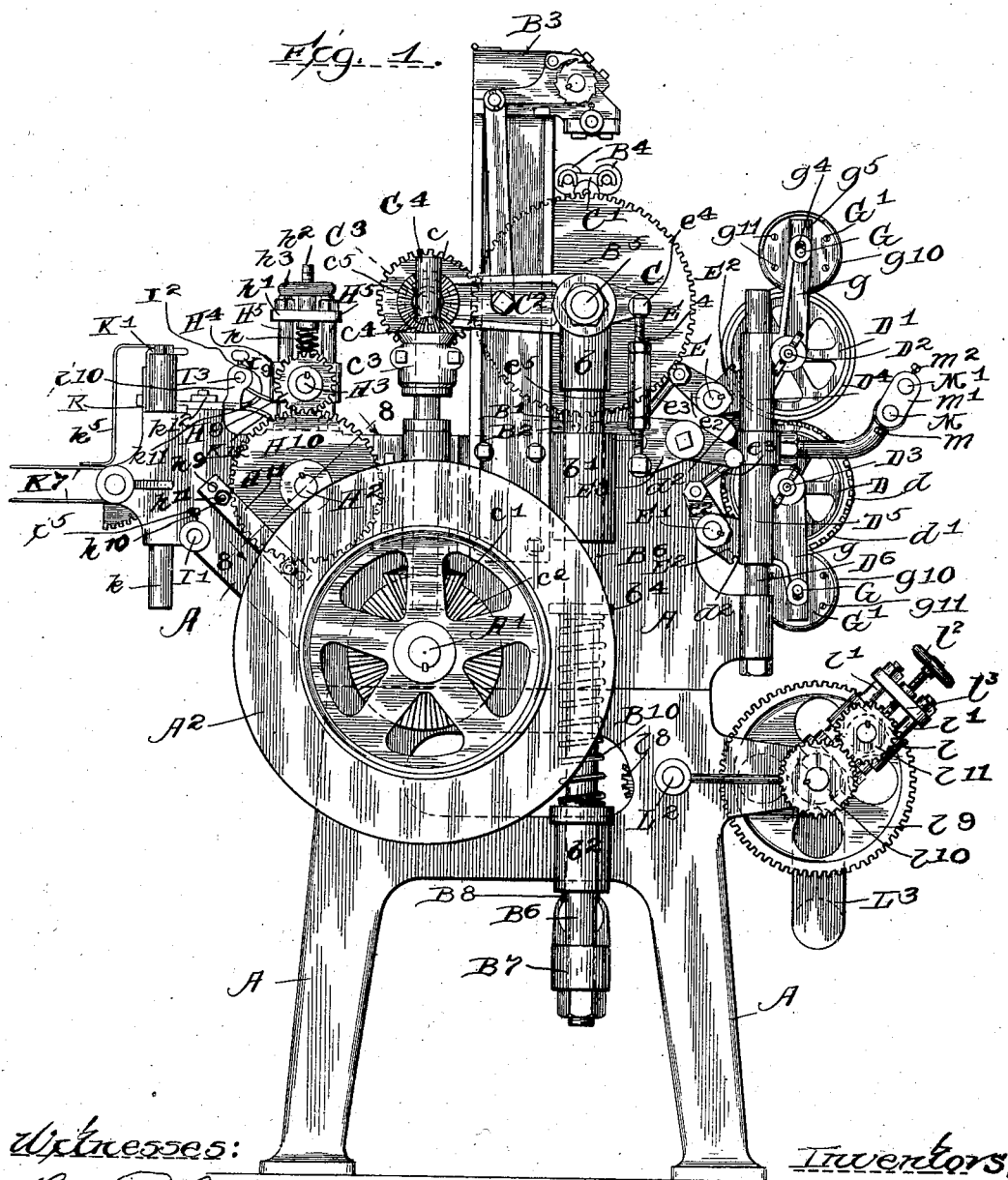

No. 709,810. Patented Sept. 23, 1902.
F. J. WENDE & B. B. CARTER.
PRINTING MACHINE.
(Application filed Aug. 13, 1900.)
(No Model.) 9 Sheets—Sheet 3.

Witnesses:
Harry R. C. White
Ray White

Inventors,
Byron B. Carter and
Frank J. Wende,
By Jno. E. Wald
Attorney.

No. 709,810. Patented Sept. 23, 1902.
F. J. WENDE & B. B. CARTER.
PRINTING MACHINE.
(Application filed Aug. 13, 1900.)
(No Model.) 9 Sheets—Sheet 4.

No. 709,810. Patented Sept. 23, 1902.
F. J. WENDE & B. B. CARTER.
PRINTING MACHINE.
(Application filed Aug. 13, 1900.)
(No Model.) 9 Sheets—Sheet 5.

No. 709,810. Patented Sept. 23, 1902.
F. J. WENDE & B. B. CARTER.
PRINTING MACHINE.
(Application filed Aug. 13, 1900.)
(No Model.) 9 Sheets—Sheet 6.

Witnesses: Inventors
Harry R. White Byron B. Carter and
Ray White. Frank J. Wende
By Geo. E. Waldo
Attorney

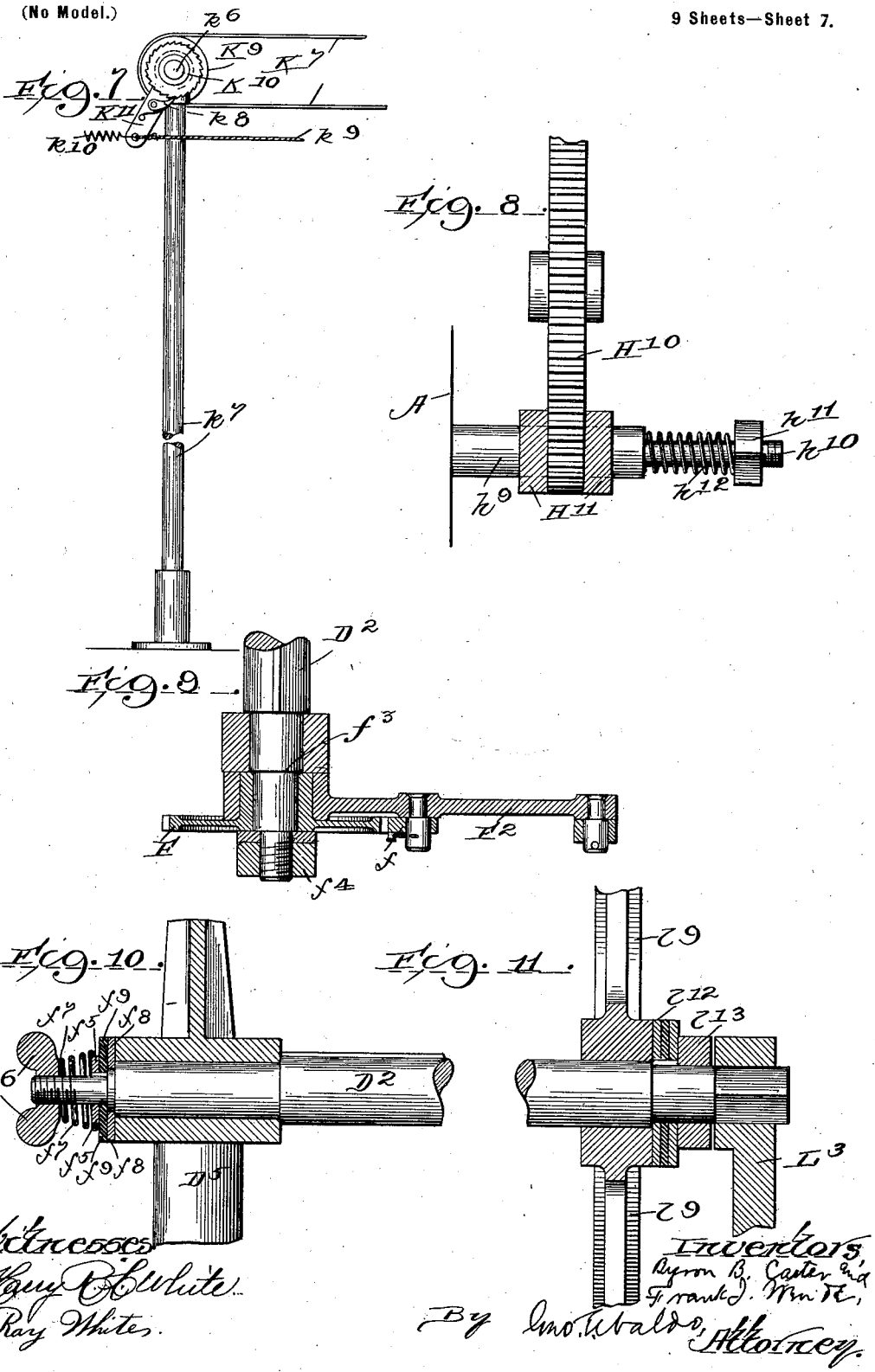

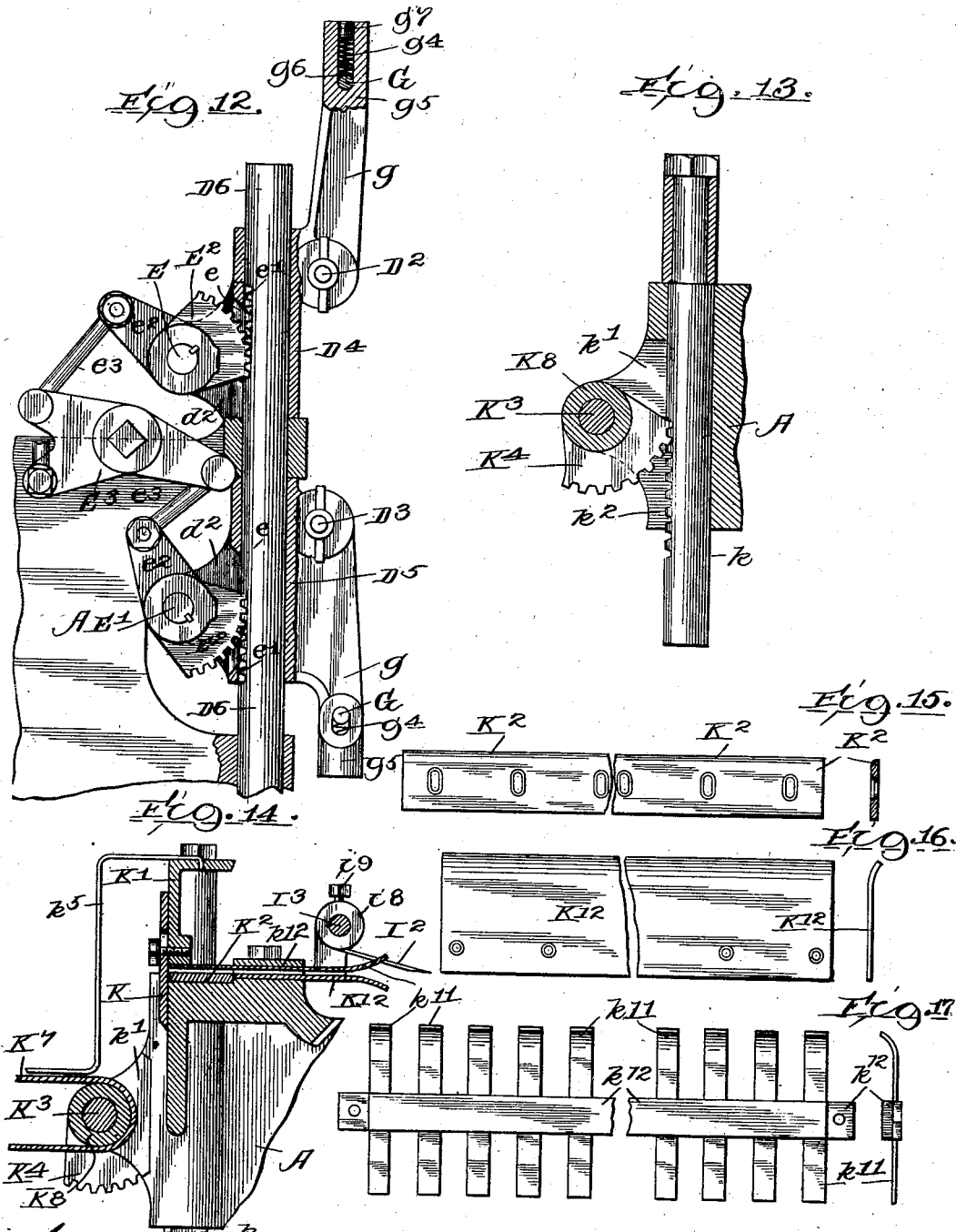

No. 709,810. Patented Sept. 23, 1902.
F. J. WENDE & B. B. CARTER.
PRINTING MACHINE.
(Application filed Aug. 13, 1900.)
(No Model.) 9 Sheets—Sheet 9.
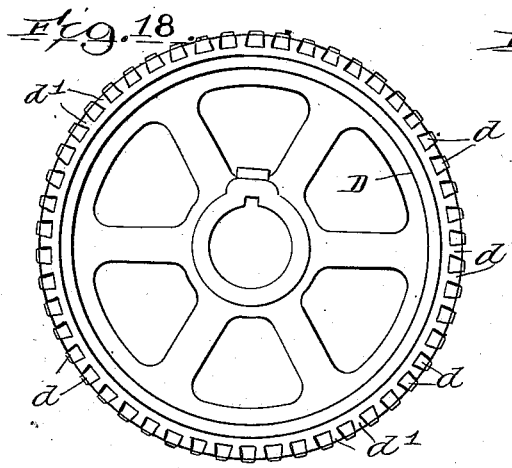
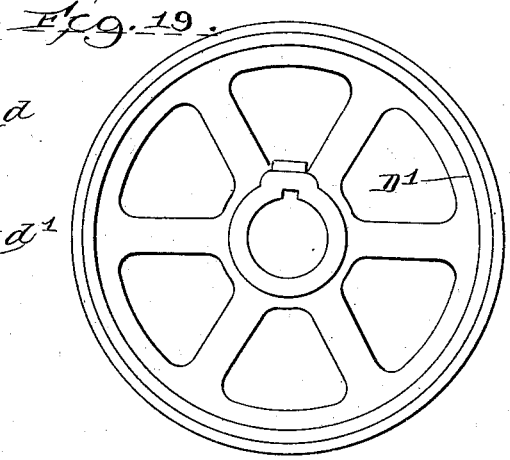
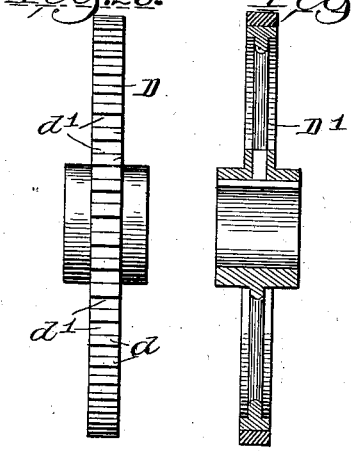
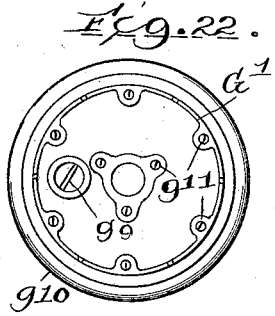
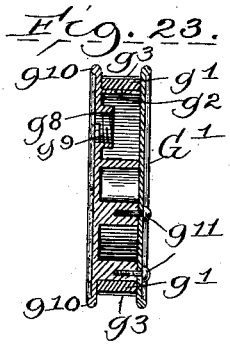
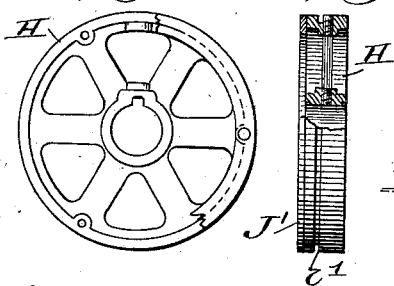
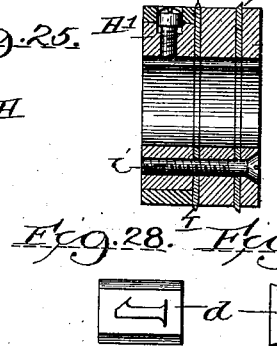
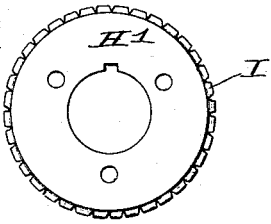
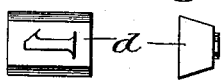
Witnesses:
Inventors,
Byron B. Carter and
Frank J. Wende,
By their Attorney.

UNITED STATES PATENT OFFICE.

FRANK J. WENDE, OF CHICAGO, AND BYRON B. CARTER, OF HINSDALE, ILLINOIS, ASSIGNORS, BY MESNE ASSIGNMENTS, TO THE D. & W. MANUFACTURING COMPANY, OF CHICAGO, ILLINOIS, A CORPORATION OF ILLINOIS.

PRINTING-MACHINE.

SPECIFICATION forming part of Letters Patent No. 709,810, dated September 23, 1902.

Application filed August 13, 1900. Serial No. 26,738. (No model.)

*To all whom it may concern:*

Be it known that we, FRANK J. WENDE, a resident of Chicago, in the county of Cook, and BYRON B. CARTER, a resident of Hinsdale, in the county of Dupage, State of Illinois, citizens of the United States, have invented certain new and useful Improvements in Printing-Machines, of which the following is a specification.

This invention relates to machinery for printing upon, imprinting numbers upon, and perforating a preferably continuous web of paper, and relates particularly to machinery for thus printing, numbering, and perforating the leaves of manifolding sales-books in very general use in stores for making facsimile bills of goods sold—one for the customer as a bill of the goods purchased and the other for the use of the auditing department of the store.

Among the objects of the invention are to provide improved means for imprinting numerals upon the paper, to provide an improved feed mechanism for delivering a web of paper to the machine, to combine the feed and perforating instrumentalities into one mechanism, and generally to combine the numbering device, printing-press, feed and perforating mechanisms, and cross-knife for cutting the web of paper into separate leaves into a machine of simple and cheap construction and which will be efficient in its operation.

A machine embodying our invention consists of the various features, combinations of features, and details of construction hereinafter described and claimed.

In the accompanying drawings a machine of our invention is fully illustrated.

Figure 2:
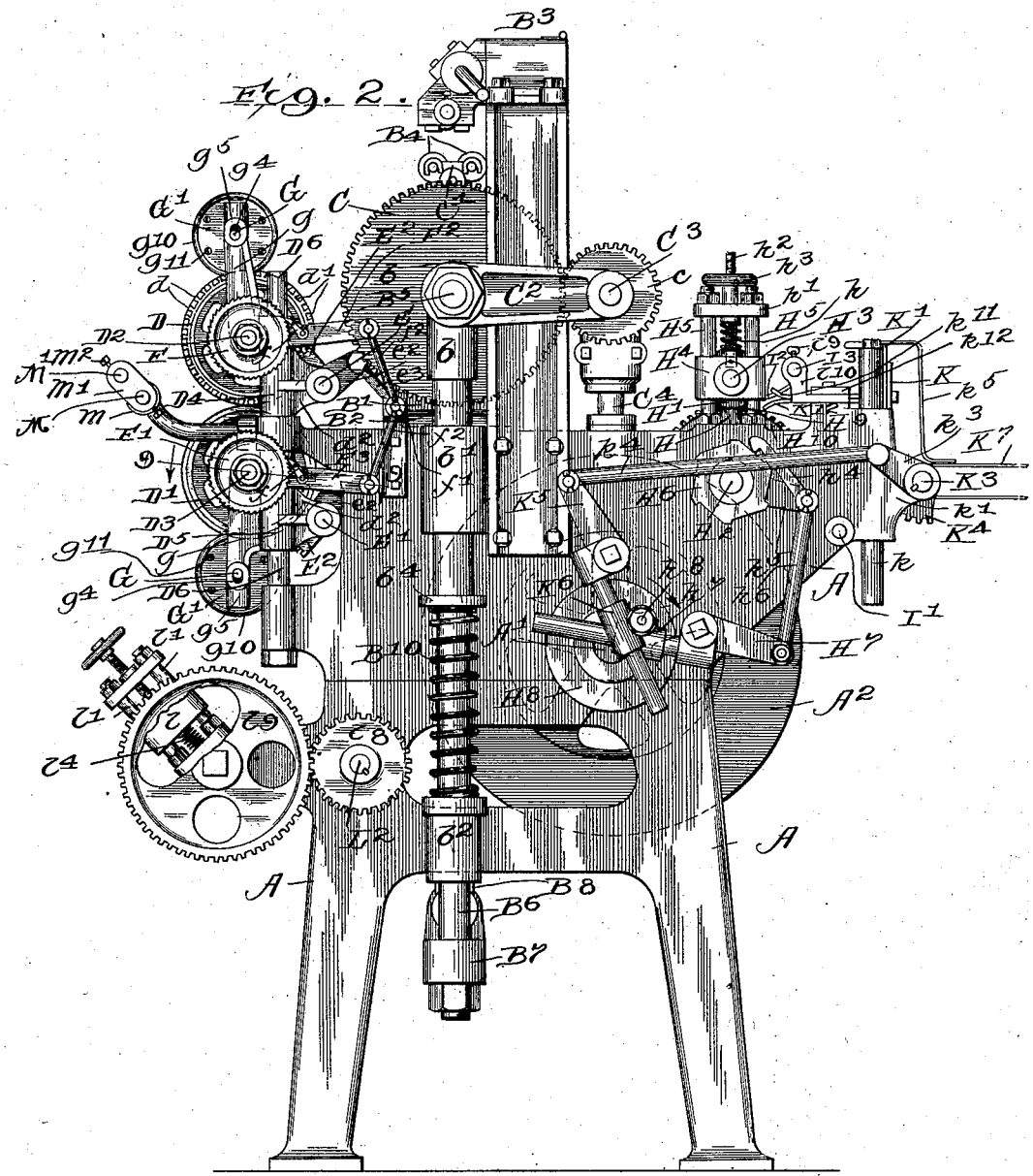
Figure 3:
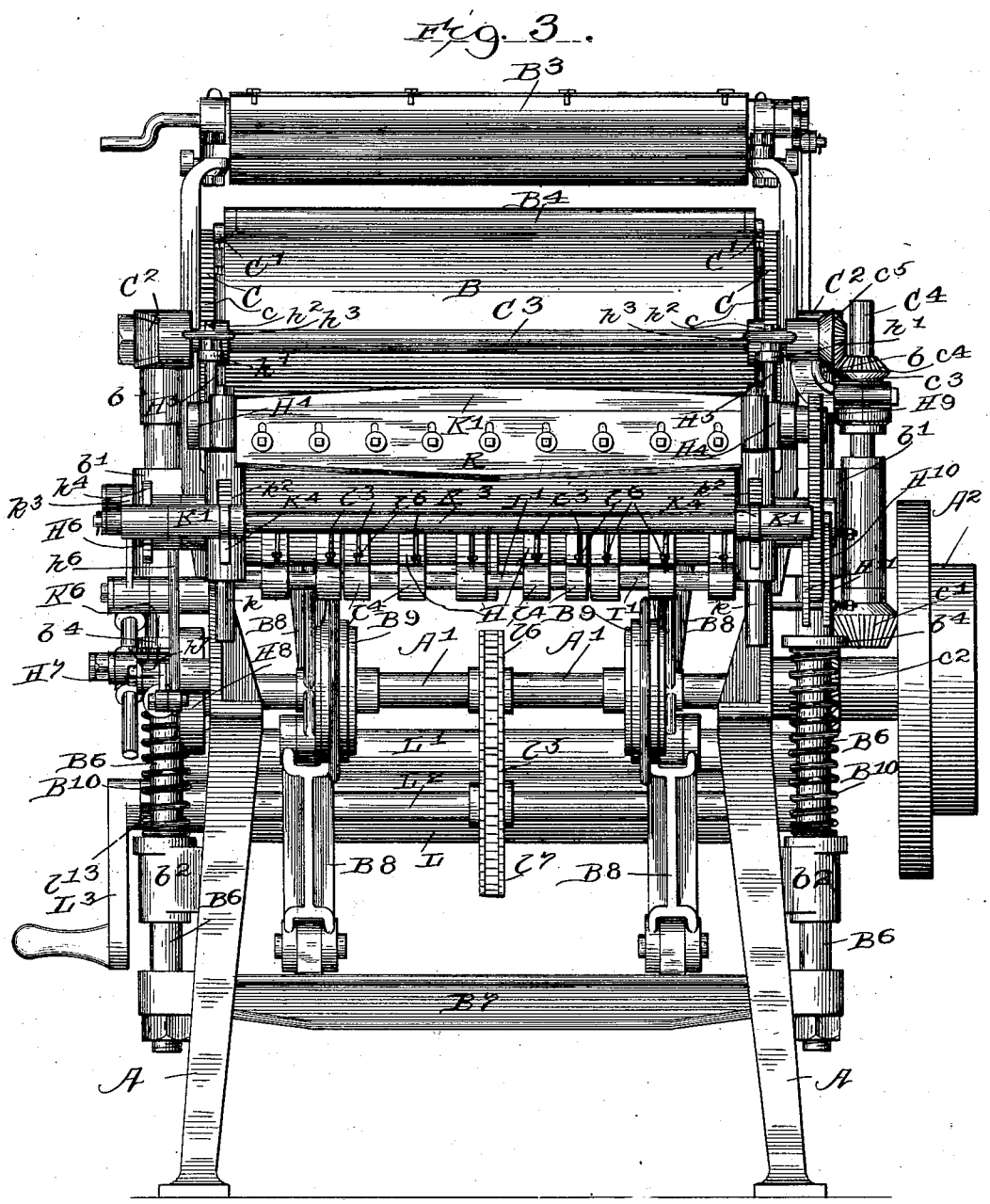
Figure 4:
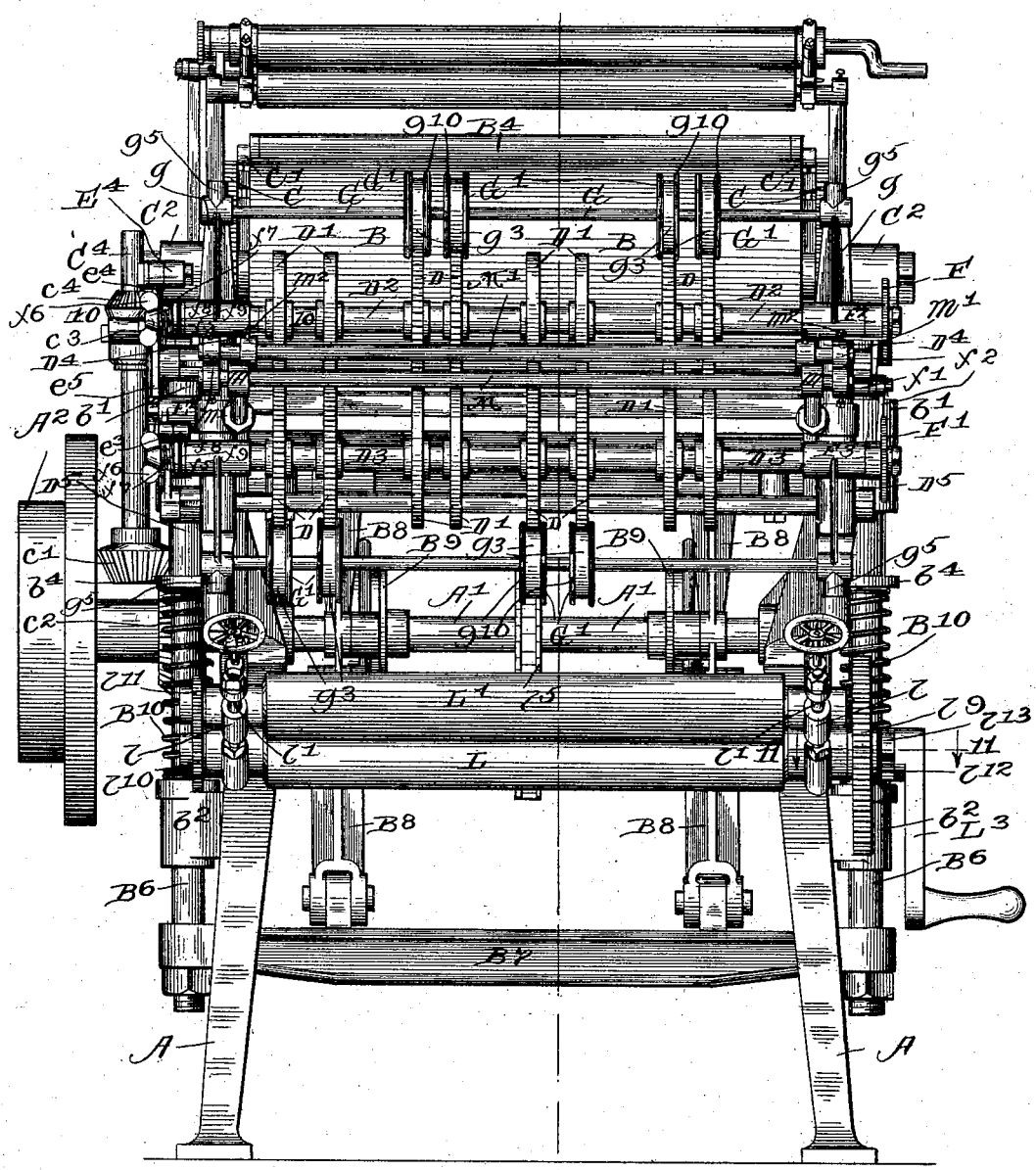
Figure 5:
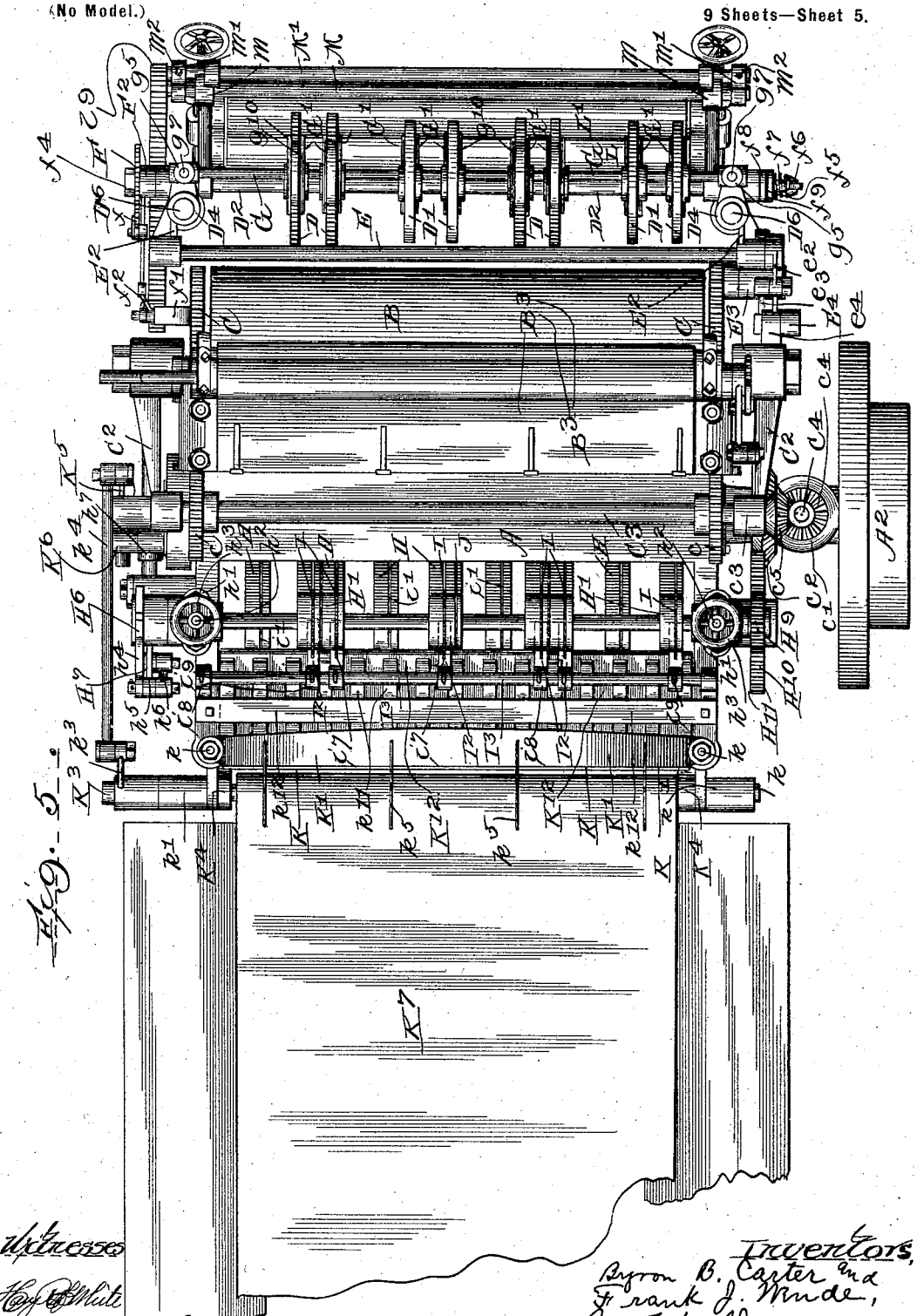
Figure 6:
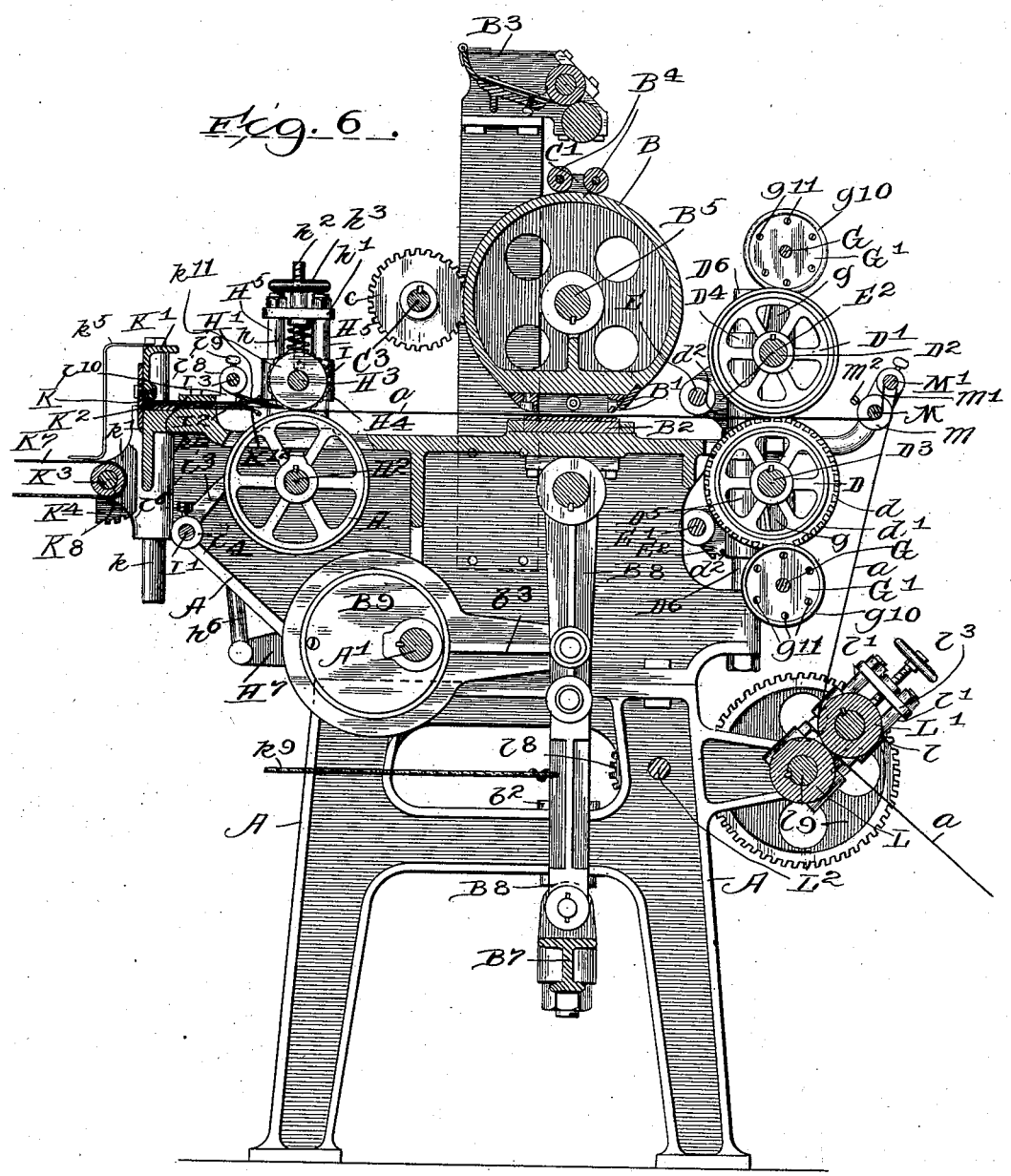

Figures 1 and 2 are elevations of opposite sides of the machine. Figs. 3 and 4 are front and rear views, respectively, of the machine. Fig. 5 is a top plan view of the machine. Fig. 6 is a vertical sectional view of the machine on the line 6 6 of Fig. 4. Fig. 7 is a side view of the apron supporting and operating devices. Figs. 8, 9, 10, and 11 are enlarged sectional views taken, respectively, on the lines 8 8 of Fig. 1, 9 9 of Fig. 2, 10 10 of Fig. 4, and 11 11 of Fig. 4; and Figs. 12, 13, 14, 15, 16, 17, 18, 19, 20, 21, 22, 23, 24, 25, 26, 27, 28, and 29 are enlarged detail views.

Referring now to the drawings, A designates the frame of the machine in which the operative parts thereof are supported. $A'$ is the driving-shaft of the machine, revolubly mounted in suitable bearings in the frame A, said shaft being driven from any suitable source of power by means of a belt applied to a pulley $A^2$, secured to said shaft, and $a$ $a$ web of paper on which the machine is operating.

As regards its printing-press feature, our machine comprises a reciprocating drum B, a printing-form $B'$, carried on said drum, a platen $B^2$ on the bed of the machine, an ink-font $B^3$, from which ink is supplied to the drum B and inking-rolls $B^4$. As regards their usual features, all of the foregoing elements are old and well-known in the art and will be readily understood by persons skilled in the art from an inspection of the drawings without a detailed description thereof.

In the preferable construction shown the drum B is rigidly secured to a rod or bar $B^5$, which is secured against rotation in housings $b$ on the upper ends of rods $B^6$, which are longitudinally movable in alined bearings formed in bosses $b'$ $b^2$ on the machine-frame. The lower ends of the rods $B^6$ are connected by a cross-head $B^7$, which is connected by means of toggles $B^8$ with the machine-frame. The toggles $B^8$ are flexed and straightened by rods $b^3$, pivoted thereto at one end and at their other ends attached to the straps of eccentrics $B^9$ on the main driving-shaft $A'$. With this construction it is obvious that rotation of said shaft $A'$ will impart a reciprocating movement to the drum B. Springs $B^{10}$, inserted between the bosses $b^2$ and collars $b^4$ on the rods $B^6$ and encircling said rods as guides, are adapted to sustain the weight of the drum B and parts carried thereon, thus equalizing the work of said toggles. Said springs also operate to prevent all lost motion of said drum B due to loose fits and the like in an obvious manner.

The inking-rolls $B^4$ are detachably secured to disks C, revolubly mounted on the shaft or rod $B^5$ at opposite ends of the drum B, by spring clips or yokes C' in a familiar manner, and rotation is imparted to said disks C in order to cause the inking-rolls $B^4$ to travel around the drum B in the following manner: Revolubly mounted at the ends of arms $C^2$, rigidly secured to and preferably formed integral with the housings $b$, is a shaft $C^3$, secured to which are pinions $c$, which are in permanent engagement with gear-teeth on the disks C.

Rotation is imparted to the shaft $C^3$ by means of driving connection between said shaft and the main driving-shaft A' of the machine as follows: Revolubly secured against longitudinal movement in a suitable bearing on the machine-frame is an upright shaft $C^4$. Secured to the lower end of the shaft $C^4$ is a beveled gear $c'$, which is in permanent engagement with a beveled gear $c^2$ on the main driving-shaft A', and splined to the upper end of the shaft $C^4$ and secured in a yoke $c^3$ on one of the arms $C^2$ is a beveled gear $c^4$, which is in permanent engagement with a beveled gear $c^5$ on the shaft $C^3$.

We will now describe the numbering mechanism of our machine.

Broadly stated, the numbering mechanism of our machine comprises any desired number of number-wheels—that is, wheels on the perimeters of which are the numerals to be imprinted on the paper—said wheels being revoluble and being movable toward and from the web of paper $a$; platens opposed to said number-wheels and movable toward and from the line of paper $a$ in substantially the same manner as said number-wheels; means to impart movement to said number-wheels and platens toward and from each other; means to impart an intermittent rotary movement to said number-wheels, and means to apply ink to the faces of the type on said type-wheels.

In the specific construction shown the number-wheels (designated by D) and the platens (designated by D' and consisting of rubber-rimmed wheels) are carried on shafts $D^2 D^3$, revolubly mounted in suitable bearings formed in sleeves $D^4 D^5$, which are longitudinally movable on studs $D^6$, rigidly secured in the machine-frame. Said number-wheels D and platen-wheels D' are preferably splined to said shafts $D^2 D^3$, so as to be longitudinally adjustable thereon, and are secured in any desired longitudinal adjustment thereon by means of set-screws.

By making the wheels carried on the shafts $D^2 D^3$ of the same diameter it is obvious that number-wheels D and platen-wheels D' on different shafts and in proper longitudinal adjustment on their respective shafts may be brought into contact with each other by proper relative movement of said shafts.

In the preferable construction shown the number-type instead of being formed directly on the number-wheels D are formed on separate blocks or pieces $d$, (see particularly Figs. 18, 19, 20, 21, 28, and 29,) which are dovetailed into the perimeters of said number-wheels, said number-wheels being provided with transverse female dovetails $d'$, adapted to receive them. As shown also, said blocks or pieces $d$ are secured in said female dovetails $d'$ by frictional engagement only and may be removed and replaced as desired.

Movement of the shafts $D^2 D^3$ toward and from each other to effect contact of the number-wheels and platen-wheels on different shafts is imparted thereto in the following manner, (see particularly Figs. 1 and 12:) Mounted in suitable bearings in lugs $d^2$ on the sleeves $D^4 D^5$ are shafts E E', to which are rigidly secured segmental gears $E^2$, which project through slots $e$ in said sleeves $D^4 D^5$ and engage gear-teeth $e'$, formed in the studs $D^6$. At one side of the machine the segmental gears $E^2$ are provided with lever-arms $e^2$, which are connected, by means of links $e^3$, with the opposite ends of a lever $E^3$, pivoted between its ends to the frame of the machine and to which oscillatory movement is imparted by a link $E^4$, which connects said lever with a stud $e^4$ on one of the housings $b$ of the drum B. To provide for adjusting the contact of the number-wheels D and platen-wheels D', the link $E^4$ is made in sections connected by a turn buckle $e^5$, whereby said lever may be made longer or shorter, as desired.

The means for imparting intermittent rotary movement to the shafts $D^2 D^3$ are as follows, (see Figs. 2 and 9:) Secured to said shafts $D^2 D^3$ are ratchet-wheels F F', the teeth of which are adapted to be engaged by spring-pawls $f$, pivoted to levers $F^2 F^3$, pivoted at one end to the shafts $D^2 D^3$, respectively, and connected at their other ends to a fixed stud $f'$ by means of links $f^2$. With the described construction it is obvious that as said shafts $D^2 D^3$ approach each other the pawls $f$ will engage the teeth of the ratchet-wheels F F' and will turn the shafts $D^2 D^3$ and also the number-wheels D. In order to provide for adjusting the number-wheels D, so as to bring the type squarely upon the platen-wheels D', the ratchet-wheels F F' are loosely fitted to the shafts $D^2 D^3$ and are secured thereto by being clamped between shoulders $f^3$ on said shafts and nuts $f^4$, threaded to the ends of said shafts. The shafts $D^2 D^3$ are also provided with tension devices, which, as shown, (see Fig. 10,) comprise collars $f^5$, keyed to said shafts and adapted to bear against the ends of the shaft-bearings, nuts $f^6$, threaded to the ends of said shafts, and coiled springs $f^7$, inserted between said collars $f^5$ and nuts $f^6$ and encircling said shafts as guides. It is obvious that said tension devices are adjustable by setting up or loosening the nuts $f^6$. In practice the tension devices will be set so as to prevent said shafts turning back with the pawls $f$ as said pawls are retracted. In the preferable construction shown also the collars $f^5$ do not bear directly against the ends of the shaft-bearings; but collars $f^8$, which are loose upon said shafts and are secured against rotation to said bearings, and washers $f^9$, of vulcanized fiber or the like and which are keyed to said shafts, are inserted between said collars $f^5$ and the ends of said shaft-bearings. The collars $f^8$ take the wear due to the friction-collars and in case of wear may be replaced, and the washers $f^9$ increase the friction generated between the collars $f^8$ and said washers.

In the preferable construction shown the means for applying ink to the number-wheels are as follows: Mounted so as to rotate freely on rods G, secured in arms or standards $g$ on the sleeves $D^4$ $D^5$, are hollow wheels G', (see Figs. 22 and 23,) designed and adapted to contain the ink. The faces of said wheels G' are covered with pads $g'$, of felt or other absorbent material, to which ink is delivered through holes or openings $g^2$, formed in the perimeters of said wheels. Preferably, also, said pads are covered with muslin strips $g^3$ or other hard absorbent material, which give a hard finish to the surface of said pads. The relation of parts is such that the surfaces of the pads on said ink-wheels G' will rest in contact with the faces of the number-type on the number-wheels D. In the preferable construction shown also the ink-wheels are held yieldingly in contact with said number-wheels, and the pressure of said ink-wheels upon said type-wheels may be adjusted in the following manner, (see Fig. 12:) The bearings for the rods G in the arms or standards $g$ are elongated, so that said rods will admit of limited movement toward and from said number-wheels D, and applied to said rods are springs $g^4$, which are confined in recesses formed in bosses $g^5$ on said arms or standards $g$. Instead of bearing directly upon the rods G caps $g^6$ are inserted between said rods and springs. The pressure of the springs $g^4$ upon the rods G, and hence of the ink-wheels G' upon the number-wheels D, may be regulated and adjusted by means of screw-plugs $g^7$, against which the outer ends of said springs bear. The ink-wheels G' are charged with ink through openings $g^8$ in the sides thereof, which are adapted to be closed by means of plugs $g^9$, threaded thereto. The ink-wheels G' are provided with flanges $g^{10}$, which extend outwardly beyond the exposed surfaces of the pads $g'$ and are adapted to embrace the sides of the number-wheels, and thus to maintain said ink-wheels in operative engagement with their respective number-wheels in an obvious manner.

The ink-wheels G' are preferably made of aluminium and, as shown, consist of two parts secured together by screws $g^{11}$, as clearly shown in the drawings, Figs. 22 and 23.

The numbers are arranged on the number-wheels D in regular sequence, usually running from "1" to "50," both inclusive, and the relation and adjustment of parts is such that at each stroke said number-wheels will be rotated a distance equal to the distance between centers of successive numbers. It is thus obvious that as the machine operates the series of numbers on each number-wheel will be imprinted upon the paper in regular sequence and that said series will be repeated indefinitely in the same order.

The feed mechanism of our machine consists of opposed feed-rolls H H', secured to shafts $H^2$ $H^3$, respectively, of which the shaft $H^2$ is revolubly mounted in fixed bearings in the machine-frame and the shaft $H^3$ is revolubly mounted in bearing-blocks $H^4$, which are provided with bearings fitted to studs $H^5$, thus rendering the shaft $H^3$ and the feed-roll H', carried thereon, movable toward and from the feed-roll H. In the preferable construction shown the feed-roll H' is held yieldingly in contact with the roll H by means of springs $h$, inserted between the bearing-blocks $H^4$ and caps $h'$, secured to the tops of the studs $H^5$. As shown also, studs $h^2$ are secured in the bearing-blocks $H^4$, which extend upwardly through openings in the caps $h'$, and threaded to said studs $h^2$ above said caps $h'$ are hand-screws $h^3$. Convenient means are thus provided for raising the roll H' out of contact with the roll H. Our invention, however, contemplates omitting the springs $h$ and allowing the roll H' to engage the roll H through gravity only.

Intermittent rotary motion is imparted to the feed-rolls in the following manner: Secured to the end of the shaft $H^2$ is a ratchet-wheel $H^6$, the teeth of which are adapted to be engaged by a pawl $h^4$, pivoted upon a lever $h^5$, one end of which is pivoted upon the hub of the ratchet-wheel $H^6$ and the other end of which is connected by a link $h^6$ with one end of a lever $H^7$, pivoted between its end upon the machine-frame. The opposite end of the lever $H^7$ is fitted to a sleeve $h^7$, pivoted to a stud or crank-pin $h^8$, secured in a disk $H^8$ on the main driving-shaft A' of the machine. The lever $H^7$ is preferably pivoted as closely as possible to the disk $H^8$. With this construction it is obvious that an intermittent rotary movement will be imparted to the shaft $H^2$ and that the rotation of the disk $H^8$ being in the direction indicated by the arrow will extend over considerably more than a half-revolution of said disk, the feed beginning and ending at points of tangency of the axis of the lever $H^7$ to the curve described by the bearing of said lever in the sleeve $h^7$. It is also obvious that the feed will start very slowly, will gradually be accelerated until it reaches its maximum speed at the middle of its travel and will then gradually be reduced and will become stationary again at its second point of tangency. Thus the paper-feed starting slowly, the paper will not be subjected to a sudden strain, and the tendency of the feed-rolls to slip on it will be reduced to a minimum. Again, the feed-rolls and adjunctive parts stopping gradually, they will have the least possible momentum when released. As shown, the shaft $H^3$ and the rolls H' carried thereon are positively driven by means of a gear $H^9$, secured to said shaft H³, which normally meshes with a gear H¹⁰, secured to the shaft H². (See Fig. 1.)

In order to stop the feed-rolls as soon as they are released from the feed-operating mechanism, a brake is provided, as follows, (see Figs. 1 and 8:) On opposite sides of the gear H¹⁰ are plates or bars H¹¹, holes in which engage studs $h^9$, secured in the machine-frame. With this construction it is obvious that said plates or bars H¹¹ will be movable toward and from the sides of said gear H¹⁰, but will not be movable in the direction of rotation of said gear, and that by clamping said plates or bars H¹¹ upon the sides of said gear they will form a friction-brake, which may be set so as to stop the feed-rolls as soon as they are released by the operating mechanism. The means for so clamping said plates or bars H¹¹ upon said gear H¹⁰ consist of bolts or studs $h^{10}$, secured in one of said plates or bars, which pass through holes in the other of said plates or bars and to which are threaded clamping-nuts $h^{11}$. In the preferable construction shown also equalizing-springs $h^{12}$ are inserted between the nuts $h^{11}$ and the adjacent plate or bar H¹¹. Preferably, also, pads of leather or the like are secured to the plates or bars H¹¹ where they bear upon said gear H¹⁰.

Any desired or approved means may be employed to perforate the paper to facilitate tearing it along desired lines of separation. In the preferable construction shown the perforating mechanism is combined with the feed mechanism, so that as the paper passes between the feed-rolls when in operative adjustment it will be perforated. To effect this, the feed-rolls H H' (see Figs. 5, 24, 25, 26, and 27) are made in sections, which are splined to their respective shafts H² H³ and are adapted to be secured thereto by set-screws, and the perforators I, which are of the familiar type consisting of thin disks, in the edges or peripheries of which teeth are formed, are clamped between sections of the feed-rolls by screws $i$, which pass through registering holes in one clamping-section and in the perforator and are threaded into the other clamping-section. The relative sizes of the sections of said feed-roll H' and of said perforators I are such that the ends of the teeth of said perforators will project a desired distance—say three sixty-fourths of an inch—beyond the face of said feed-roll and such also that the bottoms of said teeth will be inside of the face of said feed-roll or of the sections thereof. Formed in the perimeters of the sections of the feed-roll H, corresponding to the sections of the feed-roll H', between which the perforating-cutters I are clamped, are grooves $i'$, which are adapted to receive said cutters. Where as in the present case the bottoms of the grooves $i'$ are closed, it is necessary to provide means to keep said grooves clear, as otherwise dust from the perforators I would bank up in said grooves, thus preventing the proper operation of the feed and perforating mechanisms. As shown, said grooves $i'$ are kept clean by means of fingers $i^3$, Fig. 6, the ends of which are pointed and project into said grooves, so as to scrape all dust and dirt out of them. As shown, also, said fingers $i^3$ are secured to collars $i^4$, fitted to and longitudinally movable on a rod I', secured against rotation in suitable bearings in the machine-frame, as by set-screws $i^5$. The collars $i^4$, carrying the fingers, are adapted to be secured in any desired longitudinal adjustment on the rod I' by means of set-screws $i^6$.

To prevent the perforators from winding the paper around the feed-roll H', as they would naturally tend to do, stripper-fingers I², Figs. 6 and 14, are provided, which extend over the paper and inwardly beyond the edges of the perforators, being provided with slots $i^7$, adapted to receive said perforators. As shown, the stripper-fingers I² are secured to collars $i^8$, fitted to and longitudinally movable on a rod I³ and adapted to be secured in any desired longitudinal adjustment by set-screws $i^9$. As shown also, the rod I³ is secured against rotation in studs or brackets $i^{10}$ on the machine-frame.

In the construction shown also our machine comprises a slitting-cutter adapted to slit the paper lengthwise. The slitter shown is of the familiar type, consisting of a disk J, Fig. 26, secured between sections of the feed-roll H' in substantially the same manner as the perforating-cutters I, said disk projecting beyond said feed-roll and being beveled to form a sharp cutting edge, which is in the plane of one of the sides of the slitter. Secured to a corresponding section of the feed-roll H is a ring J', Fig. 25, preferably of steel and of the same diameter as said feed-roll H or the sections thereof. The cutter J is adapted to be adjusted so that the side thereof in the plane of its cutting edge will bear against the side of the ring J'. From the feed-rolls H H' the paper is delivered to a cross-knife consisting of a knife K, (for details see Fig. 14,) carried on a reciprocating cross-head K' and a stationary dead-knife K², secured to the bed of the machine and across the edge of which the movable knife K is adapted to play as the head K' reciprocates. As shown, the reciprocating head K' is secured to studs or rods $k$, Fig. 3, which are longitudinally movable in suitable bearings formed in the machine-frame. Reciprocating movement is imparted to said rods $k$ in the following manner: Revolubly mounted in suitable bearings formed in lugs $k'$ on the machine-frame is a shaft K³, to which are secured segmental gears K⁴, which extend through openings $k^2$ in the bearings of said rods or studs $k$ and engage racks formed in said rods or studs. Oscillatory movement is imparted to the shaft K³ in the following manner, Fig. 2: Secured to said shaft K³ is an arm $k^3$, which is connected by a link $k^4$ with one arm of a lever K⁵, pivoted between its ends to the machine-frame. The opposite end of the lever $K^5$ is fitted to a sleeve $K^6$, pivoted to the stud or crank-pin $h^8$, secured in the disk $H^8$ on the main driving-shaft $A'$ of the machine.

With the described construction it is obvious that the cutting stroke of the knife K will take place while the disk $H^8$ is traversing the short arc of the curve described by the bearing of the lever $K^5$ in the sleeve $K^6$ between the points of tangency of said lever to said curve. Preferably, also, the lever $K^5$ is pivoted as closely as possible to the disk $H^8$. It is thus obvious that during the cutting stroke of the knife K the lever $K^5$ will be operating with a very short leverage and that said knife will therefore descend very rapidly in a very desirable manner.

The relative positions of the points of pivotal attachment of the levers $H^7$ and $K^5$ to the machine are such that the feed-rolls H H' and the knife K will be actuated to perform their respective functions alternately, said feed-rolls being stationary during the cutting stroke of said knife and said rolls being actuated while said knife is raised or retracted out of the path of travel of the paper. The times of operation of said feed-rolls and cross-knife depend upon the angular positions of the pivotal points of the levers $H^7$ and $K^5$, relatively to the axis of the shaft $A'$, so that by properly varying the pivotal points of said levers relatively to the axis of said shaft they may be operatively actuated at any angular position of said shaft.

From the cross-knife the paper in the form of separate sheets is delivered upon an apron or other support $K^7$ by means of fingers $k^5$ on the cross-head K'. In the preferable construction shown the apron $K^7$ is supported upon rolls $K^8$ $K^9$, Figs. 6 and 7, of which the roll $K^9$ is mounted, so as to rotate freely upon the cross-knife actuating-shaft $K^3$, and the roll $K^9$ is rigidly secured to a shaft $k^6$, revolubly mounted in suitable bearings formed in standards $k^7$. An intermittent movement is imparted to the apron $K^7$ by means of a ratchet-wheel $K^{10}$, secured to the shaft $k^6$, the teeth of which are adapted to be engaged by a spring-pawl $k^8$, pivoted to a lever $K^{11}$, pivoted upon the shaft $k^6$. The lever $K^{11}$ is connected by means of a cord or wire $k^9$ with one of the toggles $B^8$ in such manner that each time said toggles are flexed said lever will be moved pivotally, so as to rotate the shaft $k^6$ sufficiently to move the apron $K^7$ a desired distance, say one-fourth of an inch. A spring $k^{10}$ applied to said lever operates to retract it upon the return movement of the toggles $B^8$.

To deliver the paper from the feed-rolls to the cross-knife, guides are provided in which the paper is confined. In the preferable construction shown the paper is guided by a plate $K^{12}$, secured to the bed of the machine on the bottom, and by guide-fingers $k^{11}$ on top, said guide-fingers being secured to a transverse rod or bar $k^{12}$, supported at its ends on the frame of the machine. The ends of the fingers $k^{11}$ adjacent to the feed-rolls are preferably upturned, so as to facilitate inserting the paper beneath the same. The opposite ends of said fingers preferably extend into close proximity to the cross-knife, so as to prevent the paper from rising with said cross-knife, the relation of parts being such that said knife will rise above said fingers.

The paper is delivered to the machine in the form of a continuous web from a roll (not shown) revolubly supported in proper position. The paper is drawn from the roll by means of delivery-rolls L L', of which the lower roll L is mounted in stationary bearings in the machine-frame, and the roll L' is mounted in bearing-blocks $l$, movable longitudinally of studs $l'$, so that said roll L' will be movable toward and from the roll L. The roll L' is advanced into contact with the roll L by means of thrust-screws $l^2$, threaded through caps $l^3$, secured to the studs $l'$, and springs $l^4$, inserted between said bearing-blocks $l$, and rigid portions of the machine-frame operate to raise said roll L' out of contact with the roll L as the screws $l^2$ are retracted. The rolls L L' when in operative contact are positively and continuously rotated in the following manner: Mounted in suitable bearings in the machine-frame adjacent to the roll L is a shaft $L^2$, to which positive rotary movement is imparted from the main driving-shaft $A'$ of the machine by means of a chain belt $l^5$, adjusted to sprocket-wheels $l^6$ $l^7$, secured to the shafts $A'$ $L^2$, respectively. A pinion $l^8$ on the shaft $L^2$ engages a gear $l^9$ on the shaft of the roll L, and secured to the shaft of the roll L' is a gear $l^{10}$, which is adapted to engage a gear $l^{11}$ on the shaft of the roll L when the roll L' is sufficiently depressed.

The relation and proportion of parts are such that running continuously the rolls L L' will deliver paper from the roll to the machine at the same average rate that the paper is fed through the machine by the intermittently-actuated rolls H H'. The gear $l^9$, instead of being rigidly secured to the shaft of the roll $L^3$, is preferably secured thereto by frictional engagement therewith, being clamped between the bearing-box of said shaft and a collar $l^{12}$, keyed to said shaft by a nut $l^{13}$, threaded to the end thereof. Preferably, also, the shaft of said roll $L^3$ is provided with a crank, whereby said roll may be turned either forward or back relatively to the gear $l^9$.

From the delivery-rolls L L' the paper passes to a tension device which operates to maintain it taut through the machine. As shown, said tension consists of a rod M, mounted in arms $m$, secured in the machine-frame, and a second rod M', secured in arms $m'$, pivoted to the rod M and adapted to be secured in any adjusted angular position thereon by set-screws $m^2$. The paper passes first around the rod M' and then under the rod M, thence through the machine to the feed-rolls, passing between the number-wheels and beneath the printing-drum. A desired tension can be obtained by properly regulating the angular position of the rod M' relatively to the rod M.

Between the delivery-rolls and the tension the paper will be slack, the slack being preferably slightly more than the feed of the machine. It is thus obvious that the only duty on the feed-rolls will be to deliver the paper between the delivery-rolls and the cut-off knife and to overcome the resistance of the tension device.

The object of securing the gear $l^9$ to the shaft of the roll L by frictional engagement only is to provide means to take up or increase the slack of the paper between the feed-rolls and the tension without stopping the machine or disturbing the adjustment of said delivery-rolls. This construction also provides means for delivering paper from the roll to the machine in case of breakage without disturbing the adjustment of said rolls.

We claim—

1. In a machine of the type described the combination of a printing-drum, means to impart a reciprocating motion to said drum, said means comprising rods fitted to and longitudinally movable in suitable bearings in the machine-frame to which said drum is rigidly secured, a cross-head secured to said rods, a toggle or toggles connected to said cross-head at one end and to the machine-frame at the other, means to flex and straighten said toggle or toggles, a numbering mechanism comprising opposed number-wheels and platen-wheels, shafts supported so as to be movable toward and from each other on which said number-wheels and platen-wheels are carried, means, controlled by the movement of the printing-drum, for imparting movement to said shafts toward and from each other and for rotating said number-wheels and platen-wheels, a feed mechanism consisting of sectional feed-rolls and means for rotating said feed-rolls, a perforating cutter or cutters secured between sections of one of said feed-rolls and a groove or grooves adapted to receive said cutter or cutters formed in the opposed feed-roll, substantially as described.

2. In a machine of the type described, the combination of a printing-drum, means to impart a reciprocating motion to said drum, said means comprising rods fitted to and longitudinally movable in suitable bearings in the machine-frame to which said drum is rigidly secured, a cross-head to which said rods are secured, a toggle or toggles applied to said cross-head, means to straighten and flex said toggle or toggles, heads or disks revolubly supported at the ends of said printing-drum, inking-rolls held yieldingly in contact with the perimeter of said printing-drum and connected to said revoluble heads or disks, means to rotate said heads or disks, said means comprising a shaft revolubly mounted in arms carried on the rods which support the printing-drum, pinions on said shaft which engage gears on said heads or disks, a shaft secured against longitudinal movement in a suitable bearing in the machine-frame, a beveled gear splined to said shaft and maintained in permanent engagement with a beveled gear secured to the pinion-shaft and a beveled gear on said shaft so mounted in the machine-frame which engages a beveled gear on the main driving-shaft of the machine, a numbering mechanism comprising opposed number-wheels and platen-wheels, shafts supported so as to be movable toward and from each other on which said number-wheels and platen-wheels are carried, means, controlled by the movement of the printing-drum for imparting movement to said shafts toward and from each other and for rotating said number-wheels and platen-wheels, a feed mechanism consisting of sectional feed-rolls and means for rotating said rolls, a perforating cutter or cutters secured between sections of one of said feed-rolls and a groove or grooves adapted to receive said cutter or cutters formed in the opposed feed-roll, substantially as described.

3. In a machine of the type described, the combination of a printing-drum, means to impart a reciprocating motion thereto, said means comprising rods fitted to and longitudinally movable in suitable bearings in the machine-frame to which said drum is rigidly secured, a cross-head secured to said rods, a toggle or toggles applied to said cross-head, means to straighten and flex said toggle or toggles, springs inserted between collars on said rods and a rigid portion of the machine-frame, a numbering mechanism comprising opposed number-wheels and platen-wheels, shafts supported so as to be movable toward and from each other, on which said number-wheels and platen-wheels are carried, means controlled by the movement of the printing-drum for imparting movement to said shafts toward and from each other to effect contact of said number-wheels and platen-wheels and means to regulate the approach of said shafts toward each other and for rotating said number-wheels and platen-wheels, a feed mechanism consisting of sectional feed-rolls and means for rotating said feed-rolls, a perforating cutter or cutters secured between sections of one of said feed-rolls and a groove or grooves adapted to receive said cutter or cutters formed in the opposed feed-roll, substantially as described.

4. In a machine of the type described, the combination of a printing-drum, means to impart a reciprocating movement thereto, said means comprising rods fitted to and longitudinally movable in bearings in the machine-frame to which said drum is rigidly secured, a cross-head secured to said rods, a toggle or toggles applied to said cross-head and means to straighten and flex said toggle or toggles, a numbering mechanism comprising opposed number-wheels and platen-wheels, shafts supported so as to be movable toward and from each other on which said number-wheels and platen-wheels are carried, means controlled by the movement of the printing-drum for imparting movement to said shafts toward and from each other and for rotating said number-wheels and platen-wheels, a feed mechanism consisting of feed-rolls and means for rotating said feed-rolls, a reciprocating cross-knife and means to impart a reciprocating motion thereto, both said feed-rolls and the cross-knife being actuated through the medium of levers pivoted upon the machine-frame to which oscillatory movement is imparted by means of sleeves pivoted to a stud or crank-pin on a driven shaft to which one end of each of said levers is fitted, substantially as described.

5. In a machine of the type described the combination with intermittently-driven feed-rolls, of constantly-driven delivery-rolls, said delivery-rolls being driven through the medium of a friction, manually-operated means to rotate said delivery-rolls independently of said driving mechanism and a tension operating in combination with the feed-rolls to maintain the paper taut through the machine, substantially as described.

6. In a machine for operating on a web of paper the combination of feed-rolls and a reciprocating cross-knife, means to impart an intermittent rotary movement to said feed-rolls and to reciprocate said cross-knife, said means comprising a driven shaft, a crank thereon, a stud or crank-pin secured in said crank, levers pivoted upon the machine-frame, an end of each of which is fitted to a sleeve pivoted upon said crank-pin or stud and operative connection between one of said levers and the feed-rolls and between the other of said levers and the reciprocating cross-knife, substantially as described 7. In a machine for operating on a web of paper the combination with feed-rolls of means to rotate the same, said means comprising a driven shaft, a crank thereon, a sleeve pivoted on a stud or crank-pin in said crank, a lever pivoted adjacent to said crank and fitted to said sleeve and operative connection between said lever and said feed-rolls, said means comprising a ratchet-wheel and a pawl adapted to engage the teeth thereof, substantially as described.

8. In a machine for operating on a web of paper the combination with feed-rolls of means to rotate the same, said means comprising a driven shaft, a crank thereon, a sleeve pivoted on a stud secured in said crank, a lever pivoted adjacent to said crank and fitted to said sleeve and operative connection between said lever and the feed-rolls, said connection comprising a ratchet-wheel and a pawl adapted to engage the teeth thereof and a brake applied to said feed-rolls, substantially as described.

9. In a machine for operating on a web of paper the combination with feed-rolls and a reciprocating cross-knife, of means to rotate said rolls and to reciprocate said cross-knife, said means comprising a driven shaft, a crank thereon, sleeves pivoted to a stud or crank-pin in said crank, pivoted levers fitted to and longitudinally movable in said sleeves, operative connection between one of said levers and the feed-rolls, said connection comprising a ratchet-wheel and pawl and operative connection between the other of said pivoted levers and said cross-knife, said connection comprising studs fitted to and longitudinally movable in bearings in the machine-frame and to which said cross-knife is secured, a revoluble shaft, gears thereon adapted to engage teeth in said studs and a link connecting said lever with a crank on said shaft, substantially as described.

10. The combination with a cross-knife of means to reciprocate the same, said means comprising a driven shaft, a crank thereon, a stud or crank-pin secured in said crank, a sleeve pivoted on said stud or crank-pin, a pivoted lever fitted to said sleeve, studs to which said cross-knife is secured, pivoted gears adapted to engage teeth formed in said studs and operative connection between said gears and said pivoted lever whereby oscillatory movement will be imparted to said gears, substantially as described.

11. The combination with a printing-drum and means to impart a reciprocating movement thereto of a numbering mechanism comprising opposed number-wheels and platens, shafts movable toward and from each other on which said number-wheels and platens are carried, means controlled by the movement of the printing-drum for imparting movement to said shafts toward and from each other and means to rotate said shafts, substantially as described.

12. The combination with a printing-drum and means to impart a reciprocating movement thereto of a numbering mechanism comprising opposed number-wheels and platens, shafts on which said number-wheels and platens are carried, sleeves in which said shafts are revolubly mounted, studs on which said sleeves are longitudinally movable, levers pivoted to said sleeves, gear-teeth thereon which engage racks on the studs to which said sleeves are fitted, a pivoted lever or levers, links which connect said pivoted lever or levers with the levers pivoted upon the sleeves in which the number-wheel shafts are mounted and a link or links which connect said pivoted lever or levers with the housing of the printing-drum and means to rotate said number-wheel and platen shafts, substantially as described.

13. The combination with a printing-drum and means to impart a reciprocating movement thereto of a numbering mechanism comprising opposed number-wheels and platens, shafts on which said number-wheels and platens are carried, sleeves in which said number-wheel and platen shafts are mounted, studs on which said sleeves are longitudinally movable, levers pivoted to said sleeves, gear-teeth thereon which engage racks on said studs, a pivoted lever or levers, links which connect said pivoted lever or levers with the levers upon said sleeves and an adjustable link or links which connect said pivoted lever or levers with the housing of the printing-drum and means to rotate said number-wheel and platen shafts, substantially as described.

14. The combination with a printing-drum and means to impart a reciprocating movement thereto of a numbering mechanism comprising opposed number-wheels and platens, shafts on which said number-wheels and platens are carried, sleeves in which said number-wheel and platen shafts are mounted, studs on which said sleeves are longitudinally movable, pivot-shafts mounted in said sleeves, levers secured to said pivot-shafts, gear-teeth thereon which engage racks formed on said studs, links which connect a lever on each of said shafts with a pivoted actuating-lever and a link which connects said actuating-lever with the housing of the printing-drum and means to rotate said number-wheel and platen shafts, substantially as described.

15. The combination with a printing-drum and means to impart a reciprocating movement thereto of a numbering mechanism comprising opposed number-wheels and platens, shafts on which said number-wheels and platens are carried, means controlled by the movement of the printing-drum to impart movement to said number-wheel and platen shafts toward and from each other and means to rotate said number-wheel shafts, said means comprising ratchet-wheels secured to said shafts, levers pivoted upon said shafts, pawls on said levers adapted to engage the teeth of said ratchet-wheels and means to impart oscillatory movement to said levers relatively to said number-wheel shafts, substantially as described.

16. The combination with a printing-drum and means to impart a reciprocating movement thereto of a numbering mechanism comprising opposed number-wheels and platens, shafts on which said number-wheels and platens are carried, means controlled by the movement of the printing-drum to impart movement to said shafts toward and from each other and means to rotate said number-wheel shafts, said means comprising ratchet-wheels secured to said shafts, levers pivoted upon said shafts, pawls on said levers adapted to engage the teeth of said ratchet-wheels and links which connect said levers with a fixed support, substantially as described.

17. The combination with a printing-drum and means to impart a reciprocating movement thereto of a numbering mechanism comprising opposed number-wheels and platens, shafts on which said number-wheels and platens are carried, means controlled by the movement of said drum to impart movement to said shafts toward and from each other, frictions applied to the number-wheel shafts and means to impart an intermittent movement to said shafts, substantially as described.

18. The combination with a printing-drum and means to impart a reciprocating movement thereto of a numbering mechanism comprising number-wheels and platens, shafts on which said number-wheels and platens are carried, means controlled by the movement of the printing-drum for imparting movement to said shafts toward and from each other, frictions applied to said shafts and means to rotate said shafts, said means comprising ratchet-wheels secured to said shafts and oscillating pawls adapted to engage the teeth thereof, substantially as described.

19. The combination with a printing-drum and means to impart a reciprocating movement thereto, of a numbering mechanism comprising opposed number-wheels and platens, shafts on which said number-wheels and platens are carried, means controlled by the movement of the printing-drum to impart movement to said shafts toward and from each other, frictions applied to said shafts and means to rotate said shafts, said means comprising ratchet-wheels adjustably secured to said shafts and oscillating pawls adapted to engage the teeth of said ratchet-wheels, substantially as described.

20. The combination with a printing-drum and means to impart a reciprocating movement thereto, of a numbering mechanism comprising opposed number-wheels and platen-wheels, shafts on which said number-wheels and platen-wheels are carried, sleeves in which said number-wheel and platen-wheel shafts are mounted, studs on which said sleeves are longitudinally movable, pivot-shafts mounted in said sleeves, levers secured to said pivot-shafts, gear-teeth thereon which engage racks in said studs, a lever on each of said pivot-shafts, links which connect said levers with an actuating-lever and a link which connects said actuating-lever with the printing-drum or the housing thereof, frictions applied to the number-wheel and platen-wheel shafts, ratchet-wheels adjustably secured to said shafts, levers pivoted upon said shafts, pawls on said levers adapted to engage the teeth of said ratchet-wheels and links which connect said levers with a rigid support, substantially as described.

21. The combination with a printing-drum and means to impart a reciprocating movement thereto, of a numbering mechanism comprising opposed number-wheels and platens, shafts movable toward and from each other on which said number-wheels and platens are carried, means to impart movement to said shafts toward and from each other, means to rotate said number-wheel shafts and means to apply ink to said number-wheels, said means comprising hollow ink-cylinders, pads secured to the perimeters thereof, holes or openings in said ink-cylinders adapted for the delivery of ink from the interior of said cylinders to said pads, rods on which said ink-cylinders are supported so as to be revoluble, the relation of parts being such that the pads on said ink-fountains will be in contact with the number-wheels and means to maintain said ink-cylinders in engagement with said number-wheels, substantially as described.

22. The combination with a printing-drum and means to impart reciprocating movement thereto, of a numbering mechanism comprising opposed number-wheels and platens, shafts on which said number-wheels and platens are carried, bearing-blocks, which are movable toward and from each other in which said shafts are mounted, means controlled by the movement of the printing-drum for imparting movement to said bearing-blocks toward and from each other, means to rotate said number-wheel shafts and means to apply ink to said number-wheels, said means comprising hollow ink-cylinders, pads secured to the perimeters of said ink-cylinders, holes or openings in said ink-cylinders adapted to deliver ink from the interiors of said cylinders to said pads, rods secured in arms on said number-wheel-shaft bearing-blocks, on which said ink-cylinders are supported, the relation of parts being such that the pads on said ink-cylinders will be in contact with said number-wheels and flanges on said ink-cylinders adapted to embrace the sides of said number-wheels, substantially as described.

23. The combination with a printing-drum and means to impart reciprocating movement thereto, of a numbering mechanism comprising opposed number-wheels and platens, shafts on which said number-wheels and platens are carried, bearing-blocks which are movable toward and from each other in which said number-wheel and platen shafts are mounted, means controlled by the movement of the printing-drum for imparting movement to said bearing-blocks toward and from each other, means to rotate said shafts and means to apply ink to said number-wheels, said means comprising hollow ink-cylinders, pads secured to the perimeters thereof, holes or openings in said ink-cylinders adapted to deliver ink from the interiors of said cylinders to said pads, rods secured in arms on said number-wheel-shaft bearing-blocks on which said ink-cylinders are supported, the relation of parts being such that the pads on said ink-cylinders will be in contact with said number-wheels, springs applied to said rods and adapted to maintain said ink-cylinders yieldingly in contact with said number-wheels and flanges on said ink-cylinders adapted to embrace the sides of said number-wheels, substantially as described.

24. The combination with a printing-drum and means to impart a reciprocating movement thereto of a numbering mechanism comprising opposed number-wheels and platen-wheels, shafts on which said number-wheels and platen-wheels are carried and on which they are longitudinally adjustable, means controlled by the movement of the printing-drum to impart movement to said shafts toward and from each other and means to rotate said shafts, substantially as described.

25. A numbering mechanism comprising opposed number-wheels and platens, shafts movable toward and from each other on which said number-wheels and platens are carried, means to impart movement to said shafts toward and from each other and means to rotate said shafts, substantially as described.

26. A numbering mechanism comprising opposed number-wheels and platens, shafts on which said number-wheels and platens are carried, sleeves in which said shafts are mounted, studs on which said sleeves are longitudinally movable, levers pivoted to said sleeves, gear-teeth thereon which engage racks on said studs, a pivoted actuating lever or levers, links which connect said levers so pivoted upon said sleeves with said actuating lever or levers, means to impart an oscillating movement to said actuating-levers and means to rotate said number-wheel shafts, substantially as described.

27. A numbering mechanism comprising opposed number-wheels and platens, shafts on which said number-wheels and platens are carried, sleeves in which said shafts are mounted, studs on which said sleeves are longitudinally movable, levers pivoted to said sleeves, gear-teeth thereon which engage racks on said studs, a pivoted actuating lever or levers, links which connect said levers so pivoted upon said sleeves with said actuating lever or levers, means to impart an oscillating movement to said actuating lever or levers, means to adjust the approach of said number-wheels and platens toward each other and means to rotate said number-wheel shafts, substantially as described.

28. A numbering mechanism comprising opposed number-wheels and platens, shafts on which said number-wheels and platens are carried, sleeves in which said shafts are mounted, studs on which said sleeves are longitudinally movable, pivot-shafts mounted in said sleeves, levers secured to said pivot-shafts, gear-teeth thereon which engage racks formed on said studs, links which connect a lever on each of said pivot-shafts with a pivoted actuating-lever, means to impart an oscillating movement to said actuating-lever and means to rotate said number-wheel shafts, substantially as described.

29. A numbering mechanism comprising opposed number-wheels and platens, shafts on which said number-wheels and platens are carried, means to impart movement to said shafts toward and from each other and means to rotate said shafts, said means comprising ratchet-wheels secured to said shafts, levers pivoted upon said number-wheel shafts, pawls on said levers adapted to engage the teeth of said ratchet-wheels and means to oscillate said levers relatively to said number-wheel shaft, substantially as described.

30. A numbering mechanism comprising opposed number-wheels and platens, shafts on which said number-wheels and platens are carried, means to impart movement to said shafts toward and from each other and means to rotate said number-wheel shafts, said means comprising ratchet-wheels secured to said shafts, levers pivoted upon said shafts, pawls on said levers adapted to engage the teeth of said ratchet-wheels and links which connect said levers with a fixed support, substantially as described.

31. A numbering mechanism comprising opposed number-wheels and platens, shafts on which said number-wheels are carried, means to impart movement to said shafts toward and from each other, a friction applied to the number-wheel shaft and means to impart rotary movement thereto, substantially as described.

32. A numbering mechanism comprising opposed number-wheels and platens, shafts on which said number-wheels and platens are carried, means to impart movement to said shafts toward and from each other, frictions applied to said shafts and means to rotate said shafts, said means comprising ratchet-wheels secured to said shafts and oscillating pawls adapted to engage the teeth of said ratchet-wheels, substantially as described.

33. A numbering mechanism comprising opposed number-wheels and platens, shafts on which said number-wheels and platens are carried, means to impart movement to said shafts toward and from each other, frictions applied to said shafts and means to rotate said shafts, said means comprising ratchet-wheels adjustably secured to said shafts and oscillating pawls adapted to engage the teeth of said ratchet-wheels, substantially as described.

34. A numbering mechanism comprising opposed number-wheels and platen-wheels, shafts on which said number-wheels and platen-wheels are carried, sleeves in which said number-wheel and platen-wheel shafts are mounted, studs on which said sleeves are longitudinally movable, pivot-shafts mounted in said sleeves, levers secured to said pivot-shafts, gear-teeth thereon which engage racks on said studs, a lever on each of said pivot-shafts, links which connect said levers with an actuating-lever, means to impart an oscillating movement to said actuating-lever, frictions applied to said number-wheel and platen-wheel shafts, ratchet-wheels adjustably secured to said shafts, levers pivoted upon said shafts, pawls on said levers adapted to engage the teeth of said ratchet-wheels and links which connect said levers with a fixed support, substantially as described.

35. A numbering mechanism comprising opposed number-wheels and platens, shafts on which said number-wheels and platens are carried, means to impart movement to said shafts toward and from each other, means to rotate said number-wheel shafts and means to apply ink to said number-wheels, said means comprising hollow ink-cylinders, pads secured to the perimeters thereof, holes or openings in said ink-cylinders adapted for the delivery of ink from the interiors of said cylinders to said pads, rods on which said ink-cylinders are supported so as to be revoluble and means to maintain said ink-cylinders in engagement with said number-wheels, substantially as described.

36. A numbering mechanism comprising opposed number-wheels and platens, means to impart relative movement to said number-wheels and platens toward and from each other, means to rotate said number-wheels and means to apply ink thereto, said means comprising revoluble hollow ink-cylinders, pads secured to the perimeters of said ink-cylinders, holes or openings in said ink-cylinders adapted for the delivery of ink from the interiors of said cylinders to said pads and means to maintain said ink-cylinders in contact with said number-wheels, substantially as described.

37. A numbering mechanism comprising opposed number-wheels and platens, shafts on which said number-wheels and platens are carried, means to impart movement to said shafts toward and from each other, means to rotate said shafts and means to apply ink to said number-wheels, said means comprising hollow ink-cylinders revolubly supported with their perimeters in contact with said number-wheels, pads secured to the perimeters of said ink-cylinders, holes or openings in said ink-cylinders adapted for the delivery of ink from the interiors of said cylinders to said pads and means to maintain said ink-cylinders in contact with said number-wheels, substantially as described.

38. A numbering mechanism comprising opposed number-wheels and platens, shafts on which said number-wheels and platens are carried, bearing-blocks which are movable toward and from each other in which said shafts are mounted, means to impart movement to said bearing-blocks toward and from each other, means to rotate said number-wheel shafts and means to apply ink to said number-wheels, said means comprising hollow ink-cylinders, pads secured to the perimeters thereof, holes or openings in said cylinders adapted to deliver ink from the interiors of said cylinders to said pads, rods secured in arms on said number-wheel-shaft bearing-blocks on which said ink-cylinders are supported and flanges on said ink-cylinders which embrace the sides of said number-wheel shafts, substantially as described.

39. A numbering mechanism comprising opposed number-wheels and platens, shafts on which said number-wheels and platens are carried, bearing-blocks in which said number-wheel and platen shafts are mounted, means to impart movement to said bearing-blocks toward and from each other, means to rotate said shafts and means to apply ink to said number-wheels, said means comprising hollow ink-cylinders, pads secured to the perimeters thereof, holes or openings in said ink-cylinders adapted to deliver ink from the interiors of said cylinders to said pads, rods secured in arms on said number-wheel-shaft bearing-blocks on which said ink-cylinders are revolubly supported, springs applied to said rods and adapted to maintain said ink-cylinders yieldingly in contact with said number-wheels and flanges on said ink-cylinders adapted to embrace the sides of said number-wheels, substantially as described.

40. In a machine for operating on a web of paper, the combination with feed-rolls, means to rotate the same and a reciprocating cross-knife, of a support beneath said cross-knife and fingers on said cross-knife which deliver the sheets of paper severed by said cross-knife to said support, substantially as described.

In testimony that we claim the foregoing as our invention we have hereunto set our hands this 8th day of August, 1900.

FRANK J. WENDE.
BYRON B. CARTER.

Witnesses for Frank J. Wende:
H. N. ASHENDER,
ANNA SCHVEIL.

Witnesses for Byron B. Carter:
C. J. BROUGHTON,
RAY A. WHITE.